M. E. FOX, R. L. RYAN & C. M. SAWYER.
TIRE TREAD.
APPLICATION FILED JAN. 31, 1917.

1,235,458.

Patented July 31, 1917.

WITNESSES

INVENTORS
MICHAEL E. FOX
ROBERT L. RYAN
CLAUDE M. SAWYER
BY
ATTORNEYS

UNITED STATES PATENT OFFICE.

MICHAEL EDWARD FOX, ROBERT LEE RYAN, AND CLAUDE MELNOTH SAWYER, OF WINSTON-SALEM, NORTH CAROLINA.

TIRE-TREAD.

1,235,458.     Specification of Letters Patent.     Patented July 31, 1917.

Application filed January 31, 1917. Serial No. 145,699.

*To all whom it may concern:*

Be it known that we, MICHAEL EDWARD FOX, ROBERT LEE RYAN, and CLAUDE MELNOTH SAWYER, citizens of the United States, and residents of Winston-Salem, in the county of Forsyth and State of North Carolina, have invented an Improvement in Tire-Treads, of which the following is a specification.

Our invention is an improvement in tire treads, and has for is object to provide a device of the character specified, which will protect the pneumatic tire from external injury, and will insure a firm grip upon the ground, without impairing the resiliency of the tire.

Figure 1:
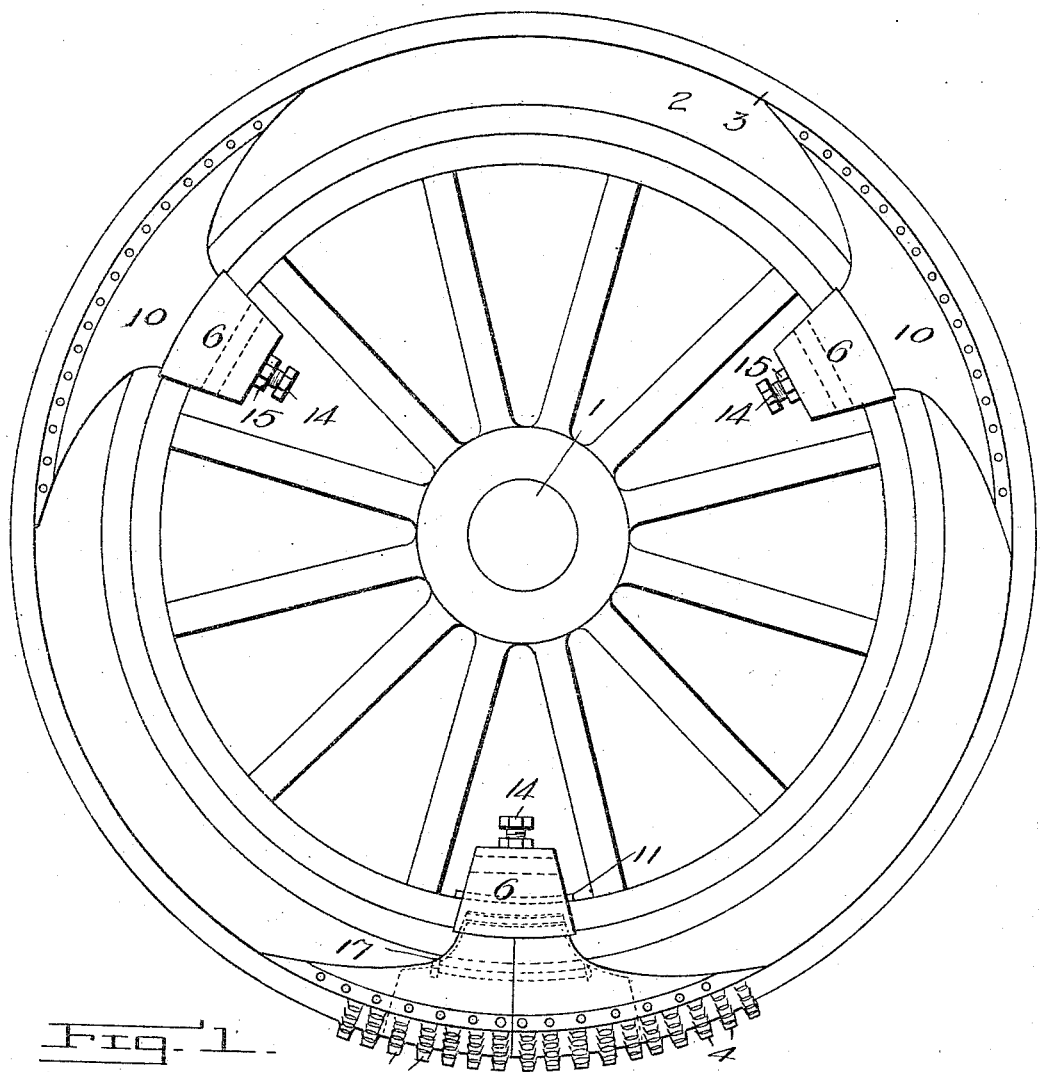
Figure 1 is a side view of a wheel provided with the improved tread.

The present embodiment of the invention is shown in connection with a wheel 1 of usual construction having a pneumatic tire 2. The improved tread comprises a band 3 of sheet steel, having spurs or lugs 4, which in the present instance are substantially cone-shaped, and the tread is of a width to extend over the tread of the tire, and is curved transversely to fit the tread. The tread is held in place on the tire by three holding devices in the present instance, each of the said devices comprising a sectional clamping member consisting of an inner section 5 and an outer section 6.

The inner section fits over the rim 7, abutting against the inner surface of the rim, and the said section has recesses 8 in its opposite sides, which are adapted to receive lugs 9 on steel holding plates 10, which are riveted to the side edges of the tread. It will be noticed from an inspection of Fig. 1 that these holding plates 10 taper toward the center of the wheel, being of considerable width at the tread, and comparatively narrow at the rim. The section 6 is a U-shaped member which fits closely over the section 5, and over the outer faces of the plates 10, to prevent disengagement of the lugs 9 from the recesses 8.

A cap plate 11 is seated on the inner face of the rim within the clamp section 5, and this cap plate is of a length to extend beyond the sections 5 and 6 at each end of the said sections. A nipple 12 extends inwardly from the cap plate, and a coil spring 13 is arranged between the cap plate and the section 5 of the clamp.

Figure 2:
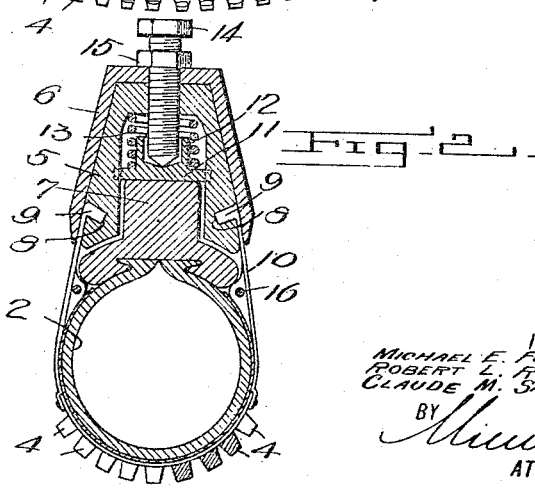
Fig. 2 is a transverse section of the tire at one of the holding devices for the tread.

It will be noticed from an inspection of Fig. 2 that the clamp section 5 is chambered to receive the cap plate, nipple and spring, and the set screw 14 is threaded through the clamp section 5 into engagement with the nipple. A lock nut 15 is provided on the set screw, and it will be evident that by turning the said screw the tension of the plates 10 and of the tread on the tire may be regulated.

The tread is a split ring, and at the ends of the split the holding plates 10 are made sectional, being divided at their centers. These sections are connected together by bolts 16, which are passed through the sections at opposite sides of the tire, and are engaged by nuts 17 to hold the parts in place. In order to place the tread, the clamp sections are first removed to disengage the holding plates 10. The tread is then placed, and the inner sections 5 of the clamping member are placed and engaged with the holding plates 10, the cap plate and spring being in place in each section 5. The sections 6 are then fitted over the sections 5, and the set screws 14 are threaded through the sections 5 and 6 into engagement with the cap plates. After the set screws are adjusted the device is ready for use.

We claim:

1. A tire tread of sheet metal shaped to fit the periphery of the tire, said tread being a split ring, and means for clamping the tread to the wheel, said means comprising pairs of holding plates secured to the side edges of the tread and tapering away therefrom, each plate having at its small end an inwardly extending lug, a sectional clamping member for each pair of plates, and comprising an inner section engaging the inner face of the rim and having notches for receiving the lugs in its opposite sides, an outer section engaging over the inner section for holding the lugs in place, and means for moving the clamp inwardly with respect to the wheel, said means comprising a set screw threaded through the clamping sections, a cap plate on the rim within the inner section with which the set screw engages, and a spring between the cap plate and the clamp.

2. A tire tread of sheet metal shaped to fit the periphery of the tire, said tread being a split ring, and means for clamping the tread to the wheel, said means comprising pairs of holding plates secured to the side edges of the tread and tapering away therefrom, each plate having at its small end an inwardly extending lug, a sectional clamping member for each pair of plates, and comprising an inner section engaging the inner face of the rim and having notches for receiving the lugs in its opposite sides, an outer section engaging over the inner section for holding the lugs in place, and means for moving the clamp inwardly with respect to the wheel.

3. A tire tread of sheet metal shaped to fit the periphery of the tire, said tread being a split ring, and means for clamping the tread to the wheel, said means comprising pairs of holding plates secured to the side edges of the tread, each plate having at the end remote from the tread an inwardly extending lug, and a sectional clamping member for each pair of holding plates, each clamping member comprising an inner section engaging the inner face of the rim and having notches in its opposite sides for receiving the lugs of the holding plates and an outer section engaging over the inner section for holding the lugs in place, and means for moving the sections away from the rim to tighten the tread.

4. A tire tread of sheet metal shaped to fit the periphery of the tire, said tread being a split ring, and means for clamping the tread to the wheel, said means comprising pairs of holding plates secured to the side edges of the tread, each plate having at the end remote from the tread an inwardly extending lug, and a sectional clamping member for each pair of holding plates and having means for engagement by the lugs.

MICHAEL EDWARD FOX.
ROBERT LEE RYAN.
CLAUDE MELNOTH SAWYER.

Witnesses:
 LATIMER WILLIAMS, Jr.,
 W. A. WILKINSON.

Copies of this patent may be obtained for five cents each, by addressing the "Commissioner of Patents, Washington, D. C."